United States Patent Office 3,342,828
Patented Sept. 19, 1967

3,342,828
METHOD OF PRODUCING QUINUCLIDONE-3
Valentina Jakovlevna Vorobjeva, Eva Evseevna Mikhlina, Mikhail Vasiljevich Roobtsov, Jury Germanovich Zelinsky, Zoja Mikhailovna Klimonova, Lev Shlemovich Gorodetsky, and Vil Josifovich Zeifman, Moscow, U.S.S.R., assignors to Vsesouzny Nauchno-Issledovatelsky Khimiko-Farmatsevtichesky Institute, "Ordzhonikidze," Moscow, U.S.S.R.
No Drawing. Filed Oct. 22, 1963, Ser. No. 318,104
2 Claims. (Cl. 260—294.7)

This invention relates to the commercial production of quinuclidone-3 used as an initial substance for the production of physiologically active compounds, such as oxylidine-chlorhydrate 3 - benzoyloxyquinuclidine, morplaniodomethlylate 3-benzoyloxyquinuclidine, aprolidinehydrochloride 3-($\alpha,\alpha$-diphenylpropionyloxy)-quinuclidine, aceclydine-salicylate 3-acetooxyquinuclidine, etc.

The conventional method of producing 3 quinuclidine consists in subjecting carbalkoxymethyl-4-carbalkoxypiperidine (diester) to cyclization according to Dickman in the presence of potassium or its alcoholates and transforming it into a potassium salt of the enolic form 2-carbalkoxychinuclidone-3.

Quinuclidone-3 is obtained after hydrolysis, decarboxylization and neutralization.

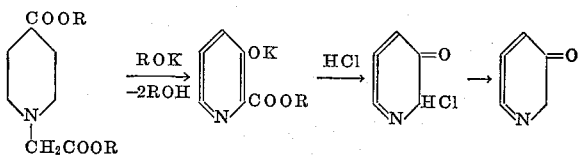

Metal potassium is used as a cyclizing reagent (G. R. Clemo, T. D. Metcalfe, J. Chem. Soc., 1523 (1937); L. Sternbach, S. Kaiser, J. Am. Chem. Soc., 74, 2215 (1952); or potassium ethylate, E. E. Miklina, M. V. Rubtsov, ZH.O.KH, 29,118 (1959); or dry potassium butylate, M. V. Rubtsov, E. E. Miklina, V. Y. Vorobyova, U.S.S.R. Author's Certificate 134,265). In every case the cyclizing reagent is introduced 2.5 times in excess of the theoretical amount. The reaction is carried out while boiling in toluene without removing the reaction alcohol.

The use of metal potassium, an inflammable and explosive reagent, creates considerable difficulties even when working on a laboratory scale. The same disadvantage remains in case of the use of potassium alcoholates obtained from alcohol and metal potassium.

The method providing for the use of potassium butylate obtained from butyl alcohol and caustic potash as a cyclizing reagent is most suitable for the production of considerable quantities of quinuclidone-3 (M. V. Rubstov, E. E. Mikhlina, V. Y. Vorobyova, U.S.S.R. Author's Certificate 134,265).

The process of producing potassium butylate by this method is carried out with water being simultaneously removed as a three-component azeotropic mixture with toluene.

After removing the whole of the reaction water, the toluene is distilled off as a two-component azeotropic mixture with butanol. Toluene (boiling point 110.75° C.) with butanol yields an azeotropic mixture with a high content of toluene (73 percent) and a boiling point (105.7° C.), lower than that of butanol.

Since the reaction of cyclizing diester proceeds with a separation of alcohol, the potassium butylate introduced into the reaction should contain no alcohol. Therefore the solution of potassium butylate in butanol obtained according to the above method is evaporated dry in a vacuum or in a nitrogen atmosphere. However even under such conditions it is not possible to ensure complete removal of the alcohol and avoid partial decomposition of the butylate.

In view of the low quality of such potassium butylate, the yield of quinuclidone-3 in laboratory conditions does not exceed 72 percent.

With an increase of the scope of production and, consequently, the amount of the initial components, the results become considerably worse due to greater difficulties in removing butanol.

The object of the present invention is to provide a method of producing quinuclidone-3 on a commercial scale.

Another object of this invention is to obtain high and stable yields of quinuclidone-3.

Still another object of the invention is to provide a method of producing alcohol-free potassium and sodium butylate from caustic alkalis, which would, while reducing the amount of the cyclizing agent, ensure a high yield of the final product, and provide warrant a safe process.

The claimed invention makes it possible to produce 3-quinuclidinone on a commercial scale by a simple high-yield method, the said 3-quinuclidinone being used for the synthesis of quinuclidone and various 3-substituted quinuclidines.

Yet another object of the invention is to provide a technological process of cyclization accompanied by an azeotropic removal of the reaction alcohol thereby reducing considerably the time of the reaction, controlling the course thereof and increasing the yield of quinuclidone.

In accordance with the above and other objects, the invention consists in the following:

The proposed method of producing quinuclidone-3 consists in cyclization of 1-carbalkoxymethyl-4-carbalkoxypiperidine in the presence of potassium butylate obtained through the interaction of caustic potash and butanol. A substance with a higher boiling point than that of its azeotropic mixture with butanol, and forming an azeotropic mixture with high content of butanol is used as a third component to remove the reaction water.

In particular, as such substances o-, m- and p-xylenes are employed (their boiling points being 144.41° C., 139.1° C. and 138.35° C., those of their azeotropic mixtures with butanol being 116.8° C., 116° C. and 115.7° C., these mixtures containing 75, 68 and 80 percent of butanol, respectively). The process is carried out with the removal of the water and then the whole of the butanol. In order to carry out the process rapidly and reduce the consumption of solvents, a fractionating column is used.

The suspension of potassium butylate thus obtained is used for the cyclizing of the diester.

For this purpose 1-carbethoxymethyl-4-carbethoxypiperidine is gradually added to the potassium butylene suspension (1–1.3 mole per 1 mole of diester) and the reaction alcohol is simultaneously removed by means of the fractionating column.

The use of xylene as a reaction medium makes it possible to remove the alcohol formed in the course of the reaction since ethanol and xylene do not form any azeotropic mixture.

Cyclization may be carried out in a vacuum, the reaction running in this case at a lower temperautre, and the yield of the final product increasing.

After the alcohols are distilled off the reaction mass is treated with hydrochloric acid, the hydrochloric acid solution boiled for saponification and decarboxylization, then concentrated by evaporation, neutralized with caustic alkalis and extracted with benzene. Quinuclidone-3 is obtained from the benzene solution, with a yield of 85 to 87 percent.

Quinuclidone-3 can be separated from the hydrochloric acid solution by neutralizing it with aqueous solutions of the alkalis with a subsequent extraction with benzene in a counter-flow fractionating column.

*Example 1*

A steel reactor with a capacity of 8 l., equipped with a fractionating column 60 mm. in diameter and a packing 2 m. high, of ceramic Raschig rings 6×6, is charged with 1.8 l. of n-butanol, 4.2 l. of xylene (a mixture of three isomers) and 156 g. of 85 percent caustic potash. The reaction mass is heated to the boiling point, the column allowed to operate for 15 minutes with complete recovery of the reflux, and separation of the lower water layer is started which is formed at a complete condensation at the column top. The upper xylene layer is continuously returned for spraying the column. When the distillate ceases to separate into layers, i.e., when the whole of the water is separated, excess butanol is distilled as an azeotropic mixture with xylene. Distillation is carried out until the butanol is completely removed (the temperature of the mass reaches 138° C. at a pressure of 760 mm. Hg).

Then, while continuing the separation of the alcohol, 450 g. of 1-carbethoxymethyl - 4 - carbethoxypiperidine are added from a drop funnel at such a rate that the temperature of the reaction mass should not drop below 137° C. A drop in the temperature of the reaction mass occurs in the case of the reaction of cyclization accompanied by the separation of the alcohol proceeding faster than the removal of the alcohol from the reaction mass.

After the complete removal of the alcohol from the column (the temperature at the column top reaching 138° C.), the mixture is cooled down to 20° C., and 0.5 l. of water and 0.25 l. of concentrated hydrochloric acid are added. After the separation of the hydrochloric solution the xylene layers are extracted by concentrated hydrochloric acid (2×2 l.).

The combined hydrochloric acid extracts are placed in a round-bottom flask with a reflux condenser, boiled for 9 hours, and concentrated by evaporation in a vacuum. The residue, which is quinuclidone-3 hydrochloride, is cooled down to 0° C. and treated while stirring with 0.5 l. of a 50 percent solution of caustic potash.

The potassium chloride is filtered, washed on a filter with benzene (5×0.5 l.) with the latter being used for a thorough extraction of the alkaline solution. The benzene extract is dried by potash and then the benzene is distilled off in a vacuum; 201.5 g. of 87 percent quinuclidone-3 are obtained as a white powder with a boiling point of 130 to 133° C.

*Example 2*

The process is carried out as described in Example 1, and the hydrochloric acid solution of quinuclidone-3 hydrochloride is neutralized with a 42 percent solution of caustic soda. The aqueous-alkaline solution of quinuclidone-3 is subjected to counterflow extraction in a packed column.

Although this invention has been described in accordance with its preferred embodiment, it should be clear that changes and modifications may be made without departing from the spirit and scope of the invention, as those skilled in the art will easily understand.

Such changes and modifications are considered as falling within the limits of the nature and scope of the invention and the appended claims.

What we claim is:

1. A method of producing quinuclidone-3, wherein 1-carbalkoxymethyl-4-carbalkoxypiperidine is cyclized in the presence of a potassium butylate suspension in a xylene medium accompanied by the azeotropic distillation of the reaction alcohol by means of a fractionating column, the resulting potassium salt of the enolic form of 2-carbalkoxyquinuclidone-3 being transformed through the action of hydrochloric acid into a hydrochloric acid solution of quinuclidone-3 hydrochloride and then treated by caustic alkali.

2. A method of producing quinuclidone-3 as claimed in claim 1, wherein said potassium butylate suspension is obtained through the interaction of caustic potash and butyl alcohol in a xylene medium, accompanied by the azeotropic removal first of the water and then of the butanol.

References Cited

FOREIGN PATENTS 540,916  5/1957  Canada.
134,265  12/1960  U.S.S.R. Author's Certificate.

OTHER REFERENCES

Sternbach, J.: Am. Chem. Soc., vol. 74, pp. 2215–2218, 1952.

WALTER A. MODANCE, *Primary Examiner.*

A. D. SPEVAK, *Assistant Examiner.*